(12) United States Patent
Vortriede (10) Patent No.: US 6,216,153 B1
(45) Date of Patent: Apr. 10, 2001

(54) NON-EXTENSIBLE THIN SERVER THAT GENERATES USER INTERFACES VIA BROWSER

(75) Inventor: Eric Gordon Vortriede, San Jose, CA (US)

(73) Assignee: CyberSource Corporation, Mountain View, CA (US)

( * ) Notice: Subject to any disclaimer, the term of this patent is extended or adjusted under 35 U.S.C. 154(b) by 0 days.

(21) Appl. No.: 09/065,648

(22) Filed: Apr. 23, 1998

(51) Int. Cl.[7] ....................................................... G06F 15/16
(52) U.S. Cl. ............................................. 709/203; 709/225
(58) Field of Search ..................................... 709/249, 202, 709/227, 245, 203, 223, 228, 229, 220, 224, 225

(56) References Cited

U.S. PATENT DOCUMENTS

| | | | |
|---|---|---|---|
| 5,862,339 | * 1/1999 | Bonnaure et al. | 709/227 |
| 5,913,033 | * 6/1999 | Grout | 709/219 |
| 5,920,696 | * 7/1999 | Brandt | 709/218 |
| 5,920,863 | * 7/1999 | McKeehan et al. | 707/10 |
| 5,991,760 | * 11/1999 | Gauvin et al. | 707/10 |
| 5,991,810 | * 11/1999 | Shapiro et al. | 709/229 |
| 6,065,120 | * 5/2000 | Laursen et al. | 713/201 |

* cited by examiner

Primary Examiner—Zarni Maung
(74) Attorney, Agent, or Firm—Hickman Palermo Truong & Becker LLP; Marcel K. Bingham (57) ABSTRACT

A system and method for displaying and processing information on a computer or communicating with a remote server is disclosed. The method and system include providing a browser and providing a thin server. The browser is configured to allow a user to view information and enter information. The thin server is for communicating with the browser, for allowing the browser to display information provided from the thin server, and for allowing the browser to provide information entered by the user to the thin server. In one aspect, the thin server is not substantially extensible. In another aspect, the thin server is configured to accept a connection only from the browser. The thin server allows communication between the browser and a remote server through communication between the browser and the thin server and communication between the remote server and the thin server. In yet another aspect, the method and system further include providing at least one local resource. The local resource can be accessed by the browser through communication between the browser and the thin server and communication between the thin server and the at least one local resource.

45 Claims, 7 Drawing Sheets

NON-EXTENSIBLE THIN SERVER THAT GENERATES USER INTERFACES VIA BROWSER

FIELD OF THE INVENTION

The present invention relates to computer application programming and more particularly to a method and system for providing a thin server which utilizes a browser for data input and display of information. The thin server is particularly useful for applications which would benefit from or require access to resources of the local system on which the browser resides, applications which reside on systems remote from the browser and which require assurance of the identity of the user or browser, and those applications which would benefit from having the look and feel of a browser.

BACKGROUND OF THE INVENTION

Conventional browsers are used to display information from and provide information to certain applications ("browser based applications"). The browser usually resides on a user's local system. The browser based application typically resides on a server remote from the user's local system ("remote server"). Thus, the browser typically accesses information from the browser based application by accessing the remote server via a public network such as the internet. Certain conventional servers are available for use on the local system on which the browser resides. Such conventional local servers serve the same functions as conventional remote servers. Thus, the conventional local server can typically be accessed not only by the browser on the local system, but also through the internet by browsers residing on other systems. By accessing different remote servers, a user is allowed to view content from and provide input to a variety of remote servers using the local browser.

Use of browser based applications are becoming increasingly popular for several reasons. Browser based applications are comparatively fast and easy to implement. Thus, such applications are attractive to developers. In addition, such applications use the browser for user interactions. As a result, browser based applications can provide a consistent look and feel to the user. In addition, browser based applications may be executed from any browser residing on a local system having a connection to the remote server on which the browser based application resides. Thus, the browser based applications appears to the user to be transportable.

Although browser based applications are popular, there are several limitations to the use of browser based applications. Because communication is typically between browsers and remote servers, restrictions are imposed to reduce security risks. Communication between a browser and a remote server is typically over a public network such as the internet. These public networks can be extremely hostile environments. Individuals may wish to gain access to confidential information residing on the local system or on the remote server. Other individuals may wish to change portions of the local system, the browser based application, or the remote server. Such changes may adversely affect the performance of the system changed. The potential for such attacks calls for the implementation of safeguards to protect the local system as well as the remote server.

One such safeguard imposed is the inability of a browser to access the local resources of the local system. As a result, a server on which the browser based application resides cannot access the local resources of the browser's local system. For example, a browser based application residing on a remote server cannot read information from the local system's disk drives. As a result, information on the local system cannot be read or modified by an external user. This aids in protecting the local system from external attack. However, it also limits the utility of browser based applications.

Conventional mechanisms exist for mitigating limitations imposed by browsers. For example, plug-ins and ActiveX controls may be available for certain browsers. Such plug-ins may allow a browser based application to access the local resources through the browser. Similarly, a conventional local server may allow access to local resources through the browser. However, mechanisms such as plug-ins are often specific to certain browsers and difficult to implement. Moreover, by allowing access to the local resources through the browser, such mechanisms typically leave the local system vulnerable to attack from users of the public network. Similarly, a conventional local server accepts connections from browsers not residing on the local system. Thus, the conventional local server also opens the local system for external attack.

Another limitation to the use of browser based applications is due to the client-server architecture inherent in browser-server communication. Browsers are typically the client in the client-server interaction. The purpose of the browser in such an interaction is to display information provided by and supply information to the remote server. The remote server contains the browser based application and data. Typically, the remote server is configured to accept a connection from any browser. However, the browser based application may and the data may be sensitive. Thus, the remote server may restrict access to the browser based application, allowing only authorized users to use the application.

Typically, a remote server determines whether a user is authorized by requiring the user to enter a password, by restricting access to specific pre-configured systems, or both. Passwords are typically considered to be not very secure because passwords can be guessed or obtained. Restricting access to an authorized system also circumvents one of the benefits of browser based applications the ability of the application to be accessed from virtually any system that is equipped with a browser and that has access to the network connected to the remote server on which the application resides. Furthermore, there are methods for fooling the remote server into believing that it is communicating with an authorized system when it is not. Consequently, such security precautions are of somewhat limited utility.

The free extensibility of remote servers and conventional local servers also limits the utility of browser based applications. In addition to their vulnerability to theft, the browser based application and data residing on the remote server may be vulnerable to being augmented or destroyed. This danger stems from the nature of conventional servers. Conventional remote servers and conventional local servers are relatively freely extensible. Conventional remote and local servers are relatively freely extensible to be able to provide certain types of content. Conventional remote and local servers provide browsers with two classes of content. First, conventional remote and local servers provide the browsers with static information typically consisting of hypertext markup language ("HTML") documents and digital images. Second, conventional remote and local servers can provide dynamic content, including HTML documents and images. Dynamic content is generated on the fly by applications. The conventional remote or local server executes these applications on the browser's behalf. Both the static content and the applications stored on the remote or local server's disk drive and are, therefore, easily changed. Thus, conventional remote servers and conventional local servers allow a user to relatively freely add functions or data, or to modify existing functions or data. As a result, the conventional remote server and conventional local server are subject to external attack.

Accordingly, what is needed are a system and method which allows a browser based application to provide its intended function without suffering from some of the above drawbacks associated with using browser based applications. In particular, it would be beneficial if the method and system allow access to local resources, communication with remote systems or servers while maintaining the security of the local system or the remote system, or which provide functions that appear to the user through the browser interface without accessing the external systems. The present invention addresses such a need.

SUMMARY OF THE INVENTION

The present invention provides a system and method for displaying and processing information on a computer or communicating with a remote server. The method and system comprise providing a browser and providing a thin server. The browser is configured to allow a user to view information and provide input. The thin server is for communicating with the browser, for allowing the browser to display information provided from the thin server and for processing information entered by the user through the browser. In one aspect, the thin server is not substantially extensible. In another aspect, the thin server is configured to accept a connection only from the local browser. The thin server can allow communication between the browser and a remote server through communication between the browser and the thin server and communication between the remote server and the thin server. In yet another aspect, the method and system further comprise providing at least one local resource. The local resource can be accessed by the browser through communication between the browser and the thin server and communication between the thin server and the at least one local resource.

According to the system and method disclosed herein, the present invention extends the capabilities of a browser, thereby increasing overall system usability.

DETAILED DESCRIPTION OF THE INVENTION

The present invention relates to an improvement in accessing information using a browser. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
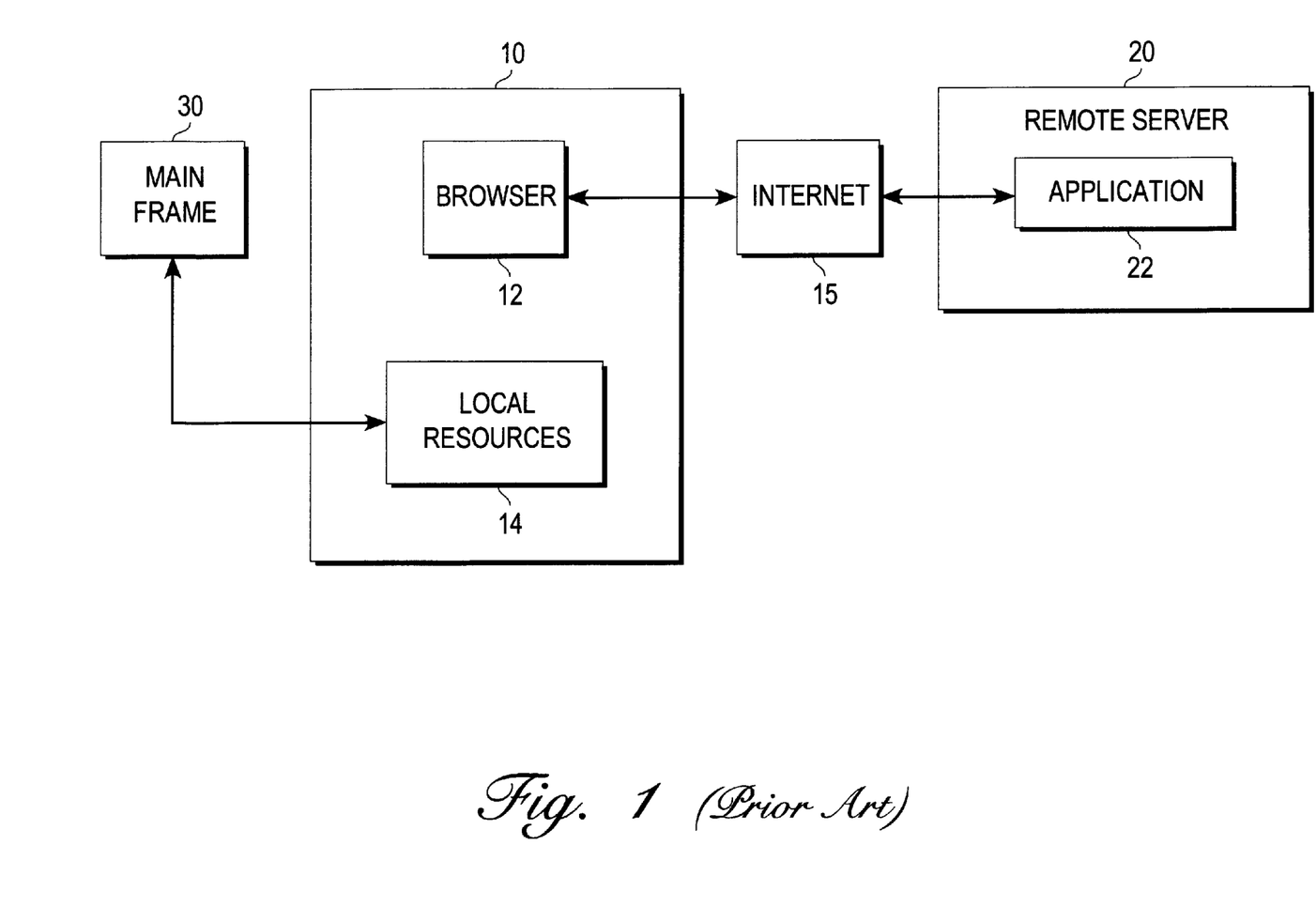
FIG. 1 is a block diagram of a conventional system for displaying information on a browser.

FIG. 1 is a block diagram of a conventional system for a user to view information located on a remote server 20 and provide information to the remote server 20. The user employs a conventional local system 10. The conventional local system 10 includes a conventional browser 12 and local resources 14. The local system 10 may also communicate with a mainframe 30 through the local resources 14. The remote server includes at least one application 22. The application 22 includes a browser based application. A browser based application utilizes a browser such as the conventional browser 12 to display information to the user and obtain information from the user. In the context of this application, the term "application" refers to a browser based application.

The remote server 20 provides content for display on many browsers 12 and is relatively freely extensible. In order to provide content for display on many browsers 12, the remote server 20 typically accepts a connection from many browsers 12. The extensibility of the remote server aids the remote server in providing certain types of information to the browser 12. In particular, the remote server 20 can provide information that is generated on the fly by an application 22 that the remote server 20 executes on behalf of the browser 12. For example, the application 22 executed by the remote server 20 could be a common gateway interface ("CGI") program which can modify or extend the functions of the remote server 20. Such a CGI program is typically not substantially limited in the functions it could add to the remote server 20. Thus, the remote server 20 is freely extensible, flexible in the tasks performed, and capable of interacting with a large number of browsers 12.

A user can view information from the application 22 or an image referenced by the application 22 using the browser 12. The user can also provide information to the application 22 through the browser 12. Typically, the browser 12 communicates with the remote server 20 via the internet 15. The protocol conventionally used for communication between the remote server 20 and the browser 12 is hypertext transport protocol ("HTTP"). Although the browser 12 is described as coupled with the remote server 20 through the internet 15, communication could also take place over a local area network (LAN) or other network. In addition, the browser 12 can be configured by the user to provide a desired look and feel. For example, the user may set the default fonts used by the browser 12.

Figure 2:
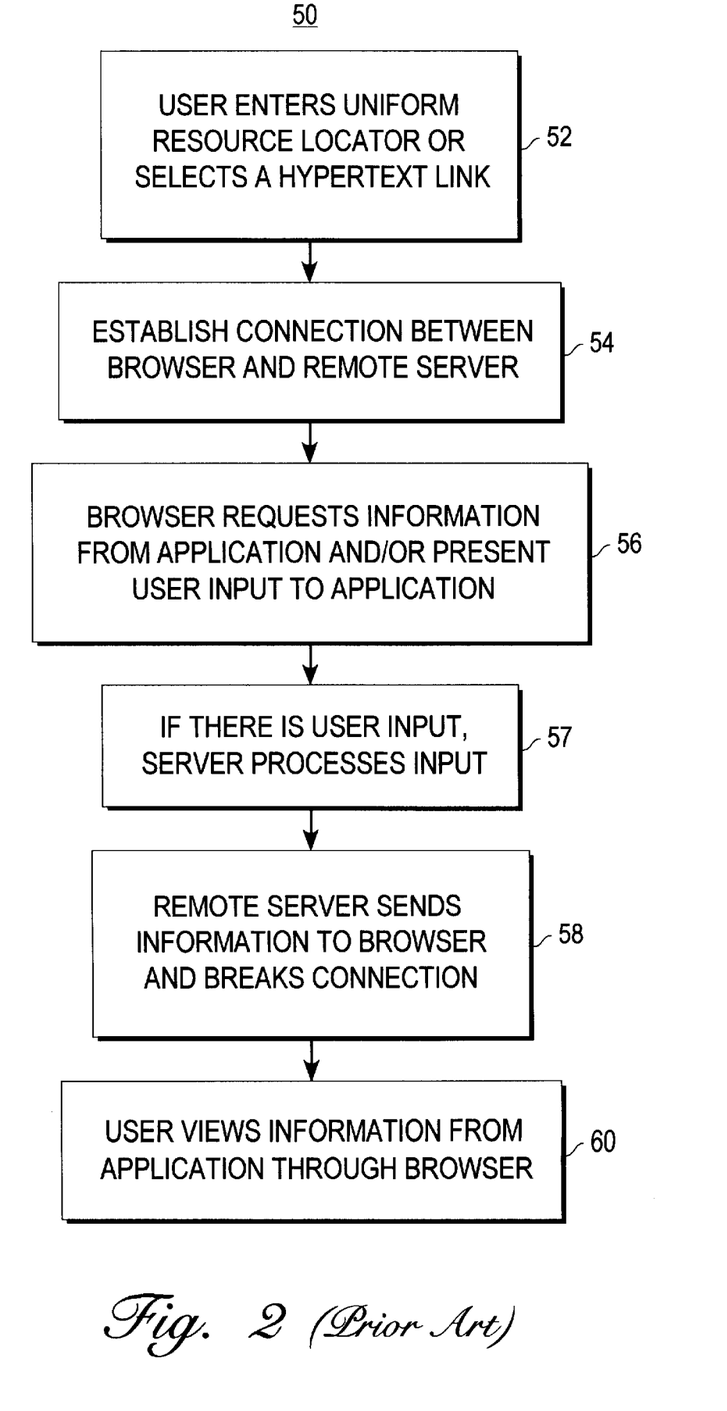
FIG. 2 is a flow chart depicting a conventional method for accessing a remote server using a conventional browser.

FIG. 2 depicts a conventional method 50 for accessing information on the remote server 20 using the browser 12. Typically, the user provides to the browser 12 the name of the remote server 20 and the name of the application 22 on the remote server 20 from which the user wishes to view information, via step 52. Typically, this is done by the user entering a uniform resource location ("URL") or by the user clicking on a hypertext link that is displayed by the browser. The browser 12 establishes a connection to the remote server 20 via step 54. The browser 12 also requests the remote server 20 for the information in the application 22 and presents to the application 22 any user input via step 56. If user input was provided in step 56, then via step 57 the application 22 processes the input. The remote server 20 sends information from the application 22 to the browser 12 and breaks the connection via step 58. The user can then view information on an user interface provided by the browser 12, in step 60.

Through the user interface provided by the browser 12, the user can view content provided by the application 22 on the remote server 20. The browser 12 and local system 10 can be located on virtually any of a number of geographic locations. In addition, the browser 12 will provide a user interface having a consistent appearance and behavior selected by the user when the user is accessing the internet 15. Moreover, the application 22 is relatively easy to implement. As a result of these features of the communication between the application 22 contained in the remote server 20 and the browser 12, browser based applications are increasingly popular.

Although the use of applications 22 is increasingly popular for the above-mentioned reasons, those with ordinary skill in the art will realize that because the browser 12 communicates with the remote server 20 via the internet 15, security measures are implemented. Because the internet 15 is public, the local system 10 and the remote server 20 must be protected from attacks by other users of the internet 15. However, one of ordinary skill in the art will also readily recognize that conventional mechanisms for providing security measures limits the utility of the browser 12 and application 22 contained in the remote server 20.

The conventional browser 12 merely displays information provided by the remote server 20 and provides the remote server 20 with information entered by the user. Thus, a conventional browser 12 has little or no access to the local resources 14 of the local system 10. As a result, the remote server 20 and, therefore, the application 22 residing on the remote server 20 cannot access the local resource 14 through the browser 12. Consequently, outside users cannot mount attacks via a remote server 20 which would adversely affect the performance of the local system 10.

However, one of ordinary skill in the art will readily realize that because the browser 12 has little or no access to the local resources 14, the user interface provided by the browser 12 will only be used when the browser 12 is communicating with the application 22 on the remote server 20. The user interface displayed when accessing the internet 15 will not appear and behave similarly to the user interface typically displayed when using the local resources 14. A consistent look and feel for the user interface is increasingly desirable as the use of the internet 15 grows. It would, therefore, be desirable to use the browser's user interface when accessing the local resources 14 or when the local system 10 is performing other tasks but is not accessing the internet 15. However, the user interface for the conventional browser 12 is typically not available except when accessing the remote server 20.

The capabilities of some browsers 12 can be extended through the use of conventional plug-ins (not shown). However, one of ordinary skill in the art will readily realize that such conventional plugins are specific for a particular version of a specific browser. Consequently, it may be difficult for most users to modify their browsers 12. Moreover, such plug-ins are generally designed to allow the browser 12 to be compatible with other content types, such as new image formats. The plug-ins are not typically intended to allow the browser 12 to execute or write conventional applications other than HTML applications. Thus, such conventional plug-ins may have limited utility.

The browser 12 might also be configured to allow applications received by the browser 12 to access the local resources 14. This might allow a user to write or execute some applications using the user interface provided by the browser 12. However, one of ordinary skill in the art will readily realize that such modifications may make the local system susceptible to attack from the internet 15 by removing the barriers to the local resources 14. In addition, many browsers 12 also will not execute applications received in this manner. Even if configured in this manner, the browser 12 will typically not allow the applications received to access the local resources 14 under all circumstances. Thus, the browser's 12 ability to access to local resources 14 and run applications on the local system 10 is still severely restricted.

Typically, the remote server 20 also contains limitations designed to reduce risks posed by users of the internet 15. Because the remote server 20 is relatively freely extensible and is typically configured to accept connections from many browsers 12, an unauthorized user gaining access to the remote server 20 can cause a great deal of damage to the remote server 20. An unauthorized user could greatly alter the environment of the remote server 20 by downloading a CGI program or introducing another application which would otherwise damage the remote server 20. In addition, the remote server 20 may also be a repository for sensitive data. Such data could include identifications for users authorized to modify the functions of the remote server 20 or identifications for users authorized engage in business transactions with the remote server 20. If unscrupulous individuals gain access to such sensitive information, the users of the remote server 20 or the vendor running the remote server 20 could be financially damaged.

Conventional servers (not shown) available for use on the local system 10 share the capabilities of the remote server 20. Such conventional local servers are, therefore, relatively freely extensible and will accept connections from other browsers (not shown) not residing on the local system 10. Consequently, conventional local servers are susceptible to the same sorts of attacks as the remote server 20.

To reduce these risks posed by the internet, access to the remote server 20 and access to information on the remote server 20 may be restricted. The remote server 20 validates users to ensure that only authorized users have access to the remote server 20. Thus, only validated, authorized users may download CGI programs, view certain secure data, or use secure applications 22. Typically, validation is accomplished by providing authorized users with a password or restricting users to specified locations, such as a particular IP location. However, one of ordinary skill in the art will readily realize that a password can be obtained or guessed. One of ordinary skill in the art will also realize that restricting access to specific locations limits one of the benefits of communication with applications contained on the remote server 20: the ability of a user to access the remote server 20 and, therefore, the applications residing on the remote server from any location.

The browser 12, on the other hand, merely displays information provided by and provides information to the remote server 20 or the conventional local server (not shown). The browser 12 typically does not have access to the local resources 14 of the local system 10. Thus, remote servers 20 are prevented from altering or accessing information stored on the local system 10 when communicating with the browser 12. The user interface of the browser 12 cannot be used when functions other than accessing the remote server 20 are performed by the local system 10. However, as discussed above, applications which use the browser 12 for user interaction are increasingly desirable. Such applications may benefit from access to the local resources 14, presenting a consistent look and feel to the user, and providing security for the local system 10 and the remote server 20 or application 22.

The present invention provides a system and method for displaying and processing information on a computer or communicating with a remote server. The method and system comprise providing a browser and providing a thin server. The browser is configured to allow a user to view information. The thin server is for communicating with the browser and for allowing the browser to display information provided from the thin server. In one aspect, the thin server is not substantially extensible. In another aspect, the thin server is configured to accept a connection only from a browser executing on the local system. The thin server can also allow communication between the browser and a remote server through communication between the browser and the thin server and communication between the remote server and the thin server. In yet another aspect, the method and system further comprise providing at least one local resource. The local resource can be accessed by the browser through communication between the browser and the thin server and communication between the thin server and the at least one local resource.

The present invention will be described in terms of a thin server utilizing specified protocols and performing particular functions. However, one of ordinary skill in the art will readily recognize that this method and system will operate effectively for thin servers performing; other functions and using other protocols.

Figure 3:
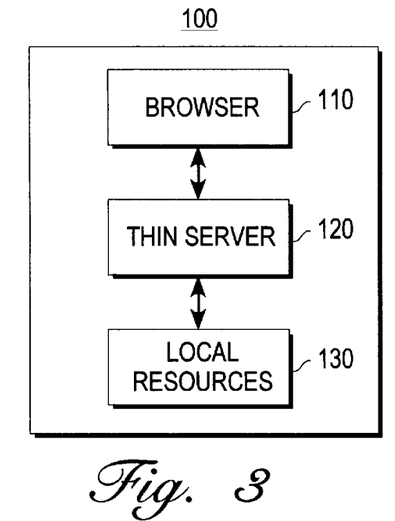
FIG. 3 is a block diagram of a system for displaying information and processing user input on a computer in accordance with the present invention.

To more particularly illustrate the method and system in accordance with the present invention, refer now to FIG. 3 depicting a block diagram of one embodiment of a local system 100 in accordance with the present invention. The local system 100 includes a browser 110, a thin server 120, and local resources 130. In a preferred embodiment, the browser 110 can be a conventional browser such as the browser 12. A conventional browser does not discriminate between communications over the internet, communications over a local area network ("LAN"), or communications with a server on the same local system 100. Thus, a conventional browser 110 may be used with the thin server 120.

The thin server 120 is capable of performing a particular set of tasks. The functions provided by a particular thin server 120 depend upon the purpose for which the thin server 120 is provided. A particular embodiment of the thin server 120, therefore, provides the functions of specific browser based application(s). However, certain features of the thin server 120 can be generalized. The thin server 120 communicates with the browser 110 on the local system 100, providing the browser 110 with information which the browser 110 can utilize. Similarly, the browser 110 can provide the thin server 120 with input from the user. In a preferred embodiment, this communication takes place using HTTP. The user interface for the functions provided by the thin server 120 is generally the user interface provided by the browser 110. In a preferred embodiment, once the thin server 120 is written, the thin server 120 is also substantially non-extensible. Thus, the set of tasks performed by the thin server 120 cannot be substantially modified by a user or another entity. Instead, those functions performed by and accessible to the thin server 120 as written are available to the user. This is in contrast to the conventional remote server 20 or the conventional local server (not shown) which are freely extensible and very flexible. In a preferred embodiment, the thin server 120 also behaves similarly to a conventional application (not shown). Thus, the thin server 120 may be capable of accessing the local resources 130. The thin server 120 also preferably accepts a connection from the local browser 110 and refuses connections from external browsers (not shown).

Figure 4:
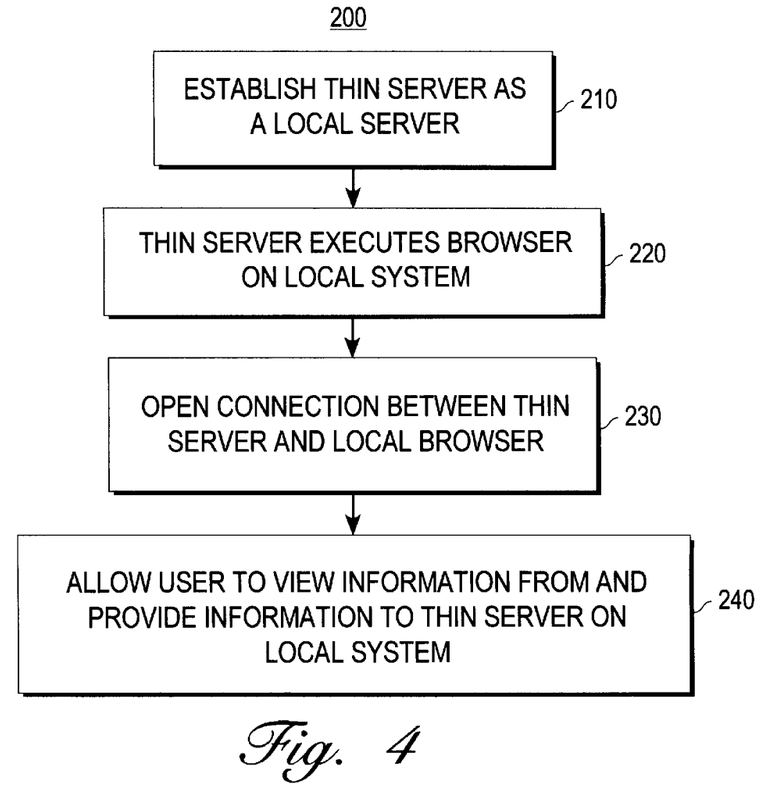
FIG. 4 is a flow chart depicting a method for establishing communication between a browser and a thin server in accordance with the present invention.

Refer now to FIG. 4 depicting one embodiment of a method 200 for establishing communication between the browser 110 and the thin server 120 in accordance with the present invention. When being executed, the thin server 120 establishes itself as a local server on the local system 100, via step 210. The thin server executes the local browser 110 via step 220. In one embodiment, the thin server 120 can perform step 220 because the thin server 120 is preconfigured with a location of the browser 110. In another embodiment, the thin server 120 can perform step 220 because the thin server 120 is capable of discovering the location of the browser 110 on the local system 100. Because of the way the thin server 120 executes the browser 110, a connection is opened between the browser 110 and the thin server 120 in step 230. Consequently, the thin server 120 can communicate with the browser 110. Via step 240, the user is then allowed to view content provided on the browser 110 by the thin server 120. The user may also be allowed to provide information to the thin server 120 from the browser 110.

As a result of the communication between the browser 110 and the thin server 120, the thin server 120 can provide functions in an environment having the look and feel of a browser 110 without accessing the internet or a LAN. The thin server 120 may be self contained, not requiring access to the local resources 130 to perform its functions. Such a thin server 120 may simply use the browser 110 to provide a user interface. Another thin server 120 might access the local resources 130 to perform its functions. For example, one function of a particular thin server 120 may be to allow a user to write or execute conventional applications using the browser 110 for input/output. Such conventional applications written or executed using the browser 110 may access the local resources 130. Therefore, a consistency of look and feel between different functions on the local system 100 is achieved through the use of the thin server 120.

As discussed previously, the thin server 120 performs a particular set of functions which may not be substantially extended. This feature of the thin server 120 can make the thin server 120 very secure. Consequently, one purpose for which a thin server 120 may be provided is to ensure the security of the local system 100. The thin server 120 is configured to accept connections only from the local browser 110. Thus, even though local resources 130 can be accessed by the browser 110, external users of the internet or LAN cannot access any of to the local resources 130 through the thin server 120. When the user wishes to access the internet, the user can still utilize the browser 110 without the thin server 120. Similarly, the thin server 120 could be configured to establish connections to specified remote servers (not shown). The thin server 120 can also be configured to terminate when the browser 110 is terminated. Consequently, the security of the local system 100 is maintained.

Figure 5:
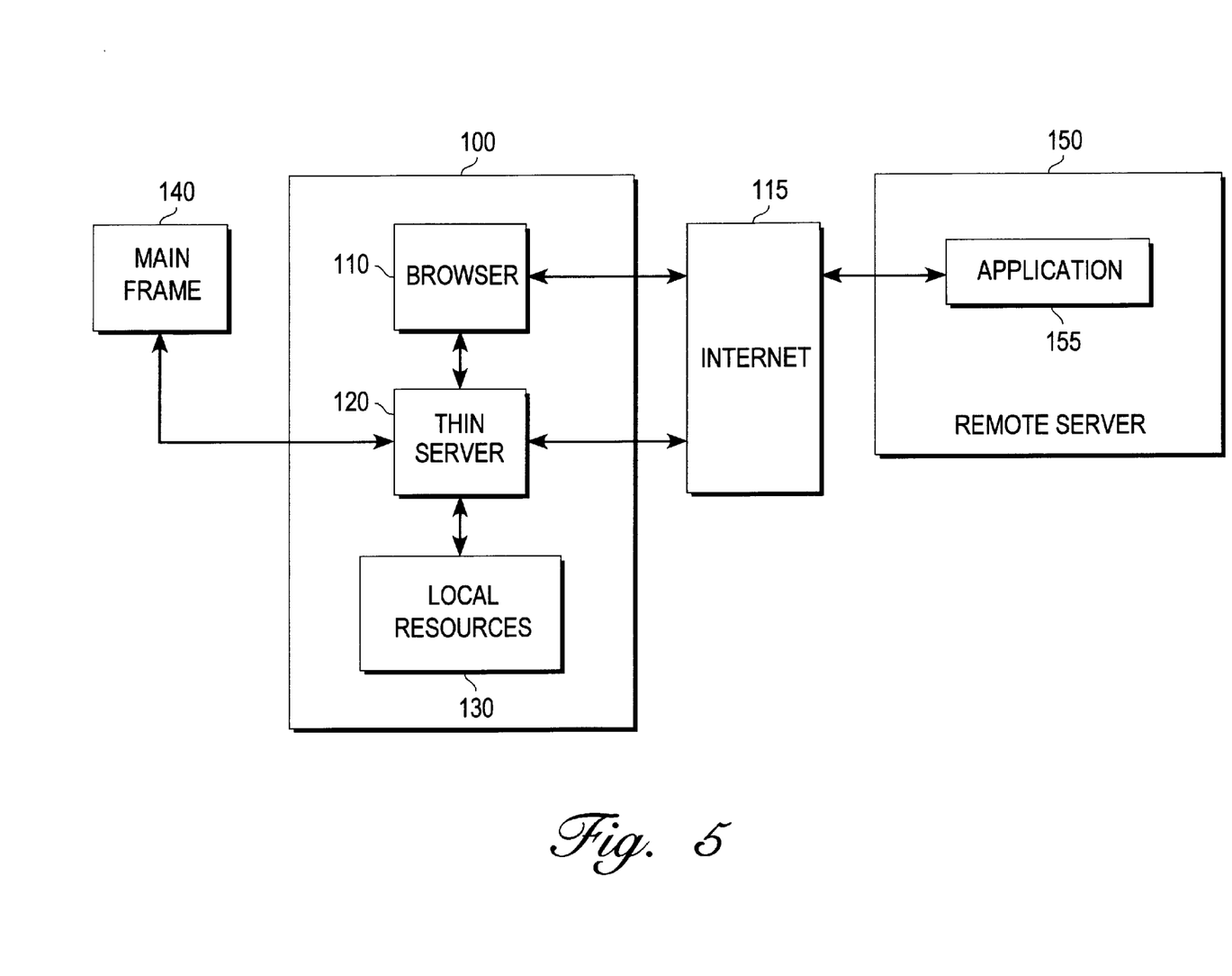
FIG. 5 is a block diagram of another system for displaying information from a remote server on a computer in accordance with the present invention.

FIG. 5 depicts the local system 100 in accordance with the present invention that is coupled with a remote server 150. The local server includes the browser 110, the thin server 120, and the local resources 130. The thin server 120 has some of the same general features as previously discussed. Consequently, the thin server 120 depicted in FIG. 5 communicates with the browser 110, is not substantially extensible, and in one embodiment, can deny access to outsiders. Communication between the browser 110 and the thin server 120 is also preferably established using the method 200 described with respect to FIG. 4. As depicted in FIG. 5, the thin server 120 can also communicate with at least the remote server 150.

The local system 100 is coupled with the remote server 150 through the internet 115. The remote server 150 includes an application 155. The application 155 may be any application capable of being run on the remote server 150 or may consist of static content such as HTML documents and images.

The local system 100 is also depicted as being coupled to a mainframe 140. In one embodiment, one function of the thin server 120 is to communicate with the mainframe 140. In a preferred embodiment of such a thin server 120, the mainframe 140 is treated similarly to the local resources 130. Consequently, the user employs the browser 110 to access the mainframe 140 through the thin server 120. In one embodiment of such a thin server 120, communication with the mainframe 140 is performed using a protocol different from the protocol used for communications between the thin server 120 and the browser 110. In one embodiment of such a thin server 120, the shift in protocol is simply a distinguishing characteristic provided by the thin server 110 required for communication with the mainframe. Thus, the thin server 120 may provide translation between protocols used by the mainframe 140 and protocols used by the browser 110. As a result, the user can access the mainframe 140 while maintaining the look and feel of the browser 110. Moreover, a browser 110 which does not have an accompanying thin server 120 may be incapable of utilizing the mainframe 140. Thus, the security of the mainframe 140 is maintained.

In one embodiment, the remote server 150 can be accessed by the browser 110 without the use of the thin server 120. The browser 110 will then behave similarly to the conventional browser 12. In the embodiment of the thin server 120 depicted in FIG. 5, the remote server 150 can be accessed by the browser 110 through the thin server 120. In such a case, the thin server 120 communicates with the application 155 on the remote server 150 via the internet 115. Note that although FIG. 5 depicts the thin server 120 as allowing the browser 110 to access the remote server 150, the local resources 130, and the mainframe 140 through the thin server 120, nothing prevents a thin server 120 from having only a portion of these functions. Similarly, nothing prevents the browser 110 from accessing other systems (not shown) through the thin server 120.

One function that the thin server 120 depicted in FIG. 5 can provide is to enhance the security of the remote server 150. When the remote server 150 is accessed through the thin server 120, the thin server 120 provides information to the browser 110 in a form the browser 110 can utilize. Because the communication with the remote server 150 is through the thin server, the form of the communication between the remote server 150 and the thin server 120 need not be the same as the form of the communication between the thin server 120 and the browser 110. For example, the protocol used to communicate with the application 155 on the remote server 150 can be other than HTTP. Note that the difference in protocols used could merely include a distinguishing characteristic provided by the thin server 120 which the application 155 expects. The difference in protocols could include a distinguishing characteristic which the remote server 150 provides which the thin server 120, but not the browser 110, expects. Similarly, the difference in protocols could include encryption provided by one of the thin server 120 or the remote server 150 and decryption provided by the other of the thin server 120 and the remote server 150. Thus, the thin server 120 translates information between the protocols used by the browser 110 and protocols used for communication with the application 155. Without this translation, a user would not be able to use the browser 110 to communicate with the remote server 150. In addition, another function of the thin server 120 could include ensuring that connection has been made to the appropriate remote server 150. Consequently, one embodiment of the thin server 120 could provide validation of users or the remote server 150 and, therefore, security for the remote server 150 or the local system 100.

Figure 6:
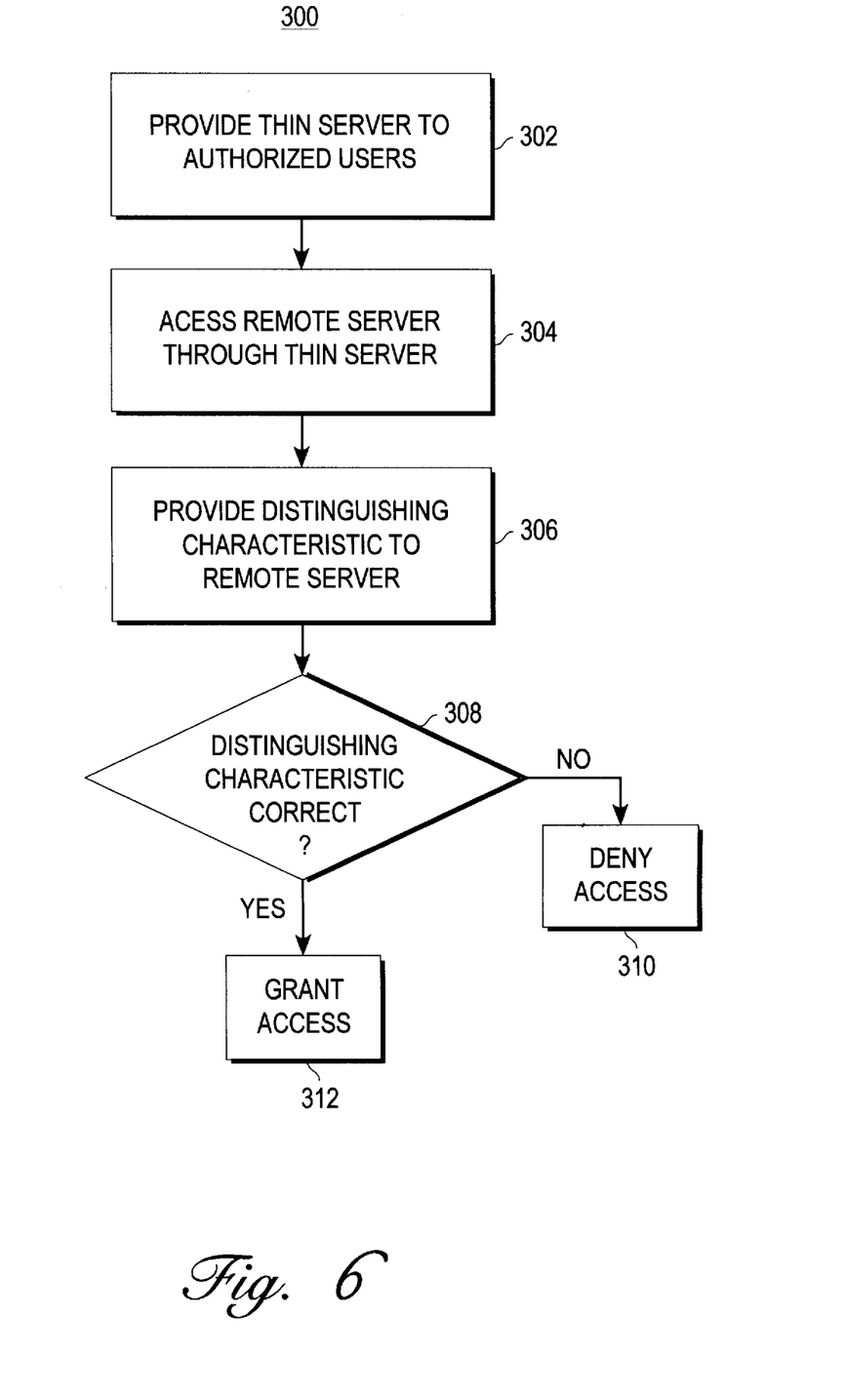
FIG. 6 is a flow chart depicting a method for validating authorized users' access to at least a portion of a remote server.

FIG. 6 depicts one method 300 for ensuring that only authorized users have access to the remote server 150 or a secure application on the remote server 150. Thus, the method 300 can be used to validate users for the remote server 150. A particular thin server 120 is provided to authorized users via step 302. The thin server 120 is used to access the remote server 150 via step 304. The thin server 120 provides a distinguishing characteristic to the remote server 150 via step 306. In one embodiment, the distinguishing characteristic is a certificate, discussed below. In another embodiment, the distinguishing characteristic may be encryption, a hidden URL or other characteristic not provided by the browser 110 alone. The remote server 150 then determines whether the distinguishing characteristic is correct, via step 308. In one embodiment, the 308 includes the step of determining whether the certificate is authentic. If the distinguishing characteristic is not recognized as correct, then the user is denied access via step 310. If, however, the distinguishing characteristic is determined to be correct, then the user is granted access via step 312. Consequently, the security of the remote server 150 is preserved by only granting access to authorized users.

A thin server 120 that is written for the sole function of providing secure access to a remote server 150 as described above would preferably be relatively small. Consequently, the thin server 120 may be transportable to different local systems 100. A user can thus use other local systems 100 to access the remote server 150. Moreover, where the thin server 120 provides access to a secure application 155, the authorized users holding the thin server 120 are not restricted to using particular local systems in order to gain access to the secure applications 155. An authorized user merely takes the thin server 120 to the location from which the user wishes to access the remote server 150. The thin server 120 may also be written such that the user must also provide a password to further ensure the security of the remote server 150 and guard against theft of such a thin server 120. Thus, one benefit of providing a remote server 150, transportability, is maintained even for secure remote servers 150.

Figure 7:
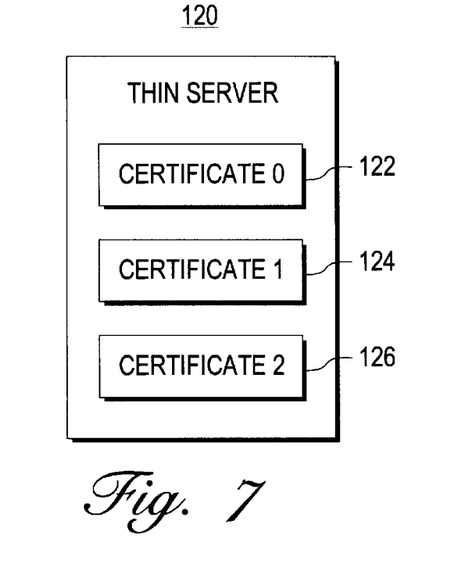
FIG. 7 is a block diagram depicting one embodiment of a particular thin server used in validating users' transactions.

The thin server 120 could also be configured to perform other functions with other applications 155 on the remote server 150. One such function is the validation of purchases over the internet 115. FIG. 7 depicts one embodiment of a thin server 120 for validating users' purchases. Preferably, the thin server 120 is provided to the user by a vendor for the items which the user wishes to purchase over the internet 115. The thin server 120 includes certificates 122, 124, and 126. Although the thin server 120 is depicted as having three certificates 122–126, nothing prevents the thin server 120 from having another number of certificates. In one embodiment, each certificate 122, 124, or 126 corresponds to a remote server 150 and a product that the end user has purchased. Consequently, the thin server 120 will use the appropriate certificate 122, 124, or 126 when communicating with the corresponding remote server 150.

Figure 8:
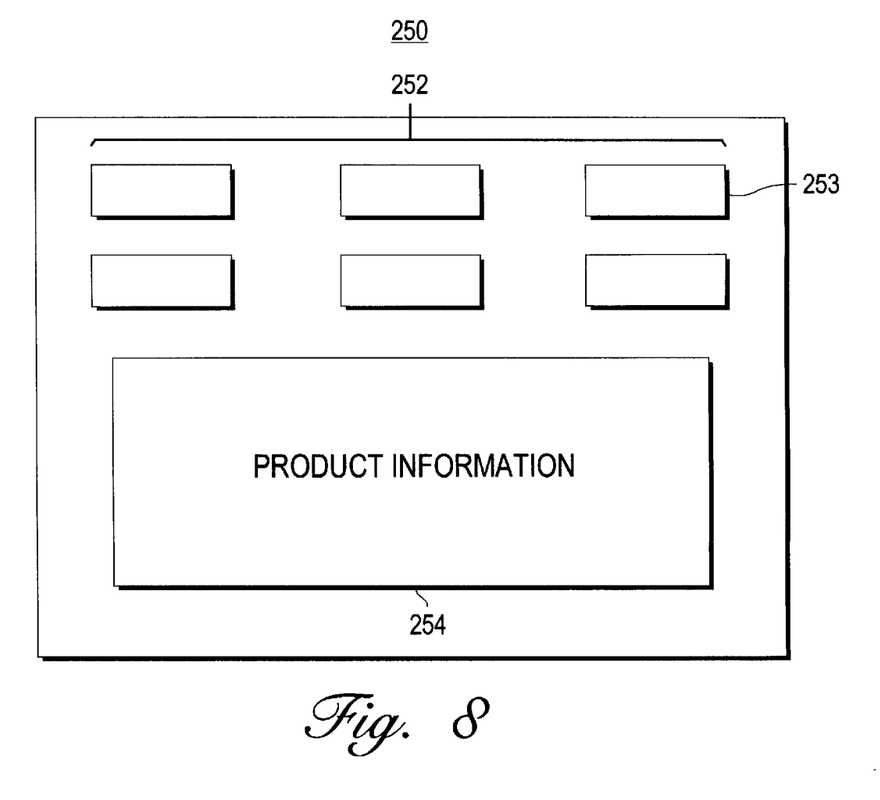
FIG. 8 depicts one embodiment of a user interface in accordance with the present invention.

FIG. 8 depicts one embodiment of a user interface 250 provided by the thin server 120. The user interface 250 is provided via the browser 110. The user interface 250 includes buttons 252 and product information 254. In one embodiment, each user interface 250 is provided by HTML documents, electronically stored images, and other content that the browser 110 understands corresponding to the certificate 122, 124, or 126. In one embodiment, each of the buttons 252 is a link to a corresponding HTML document (not shown). As a user clicks on one of the buttons 252, information is exchanged between the thin server 120 and the browser 110. The user interface 250 is, therefore, updated. In addition, when the user selects a button indicating a desire to obtain the item that has been purchased, the thin server 120 will communicate with the appropriate remote server 150 and validate the user's purchase.

Figure 9:
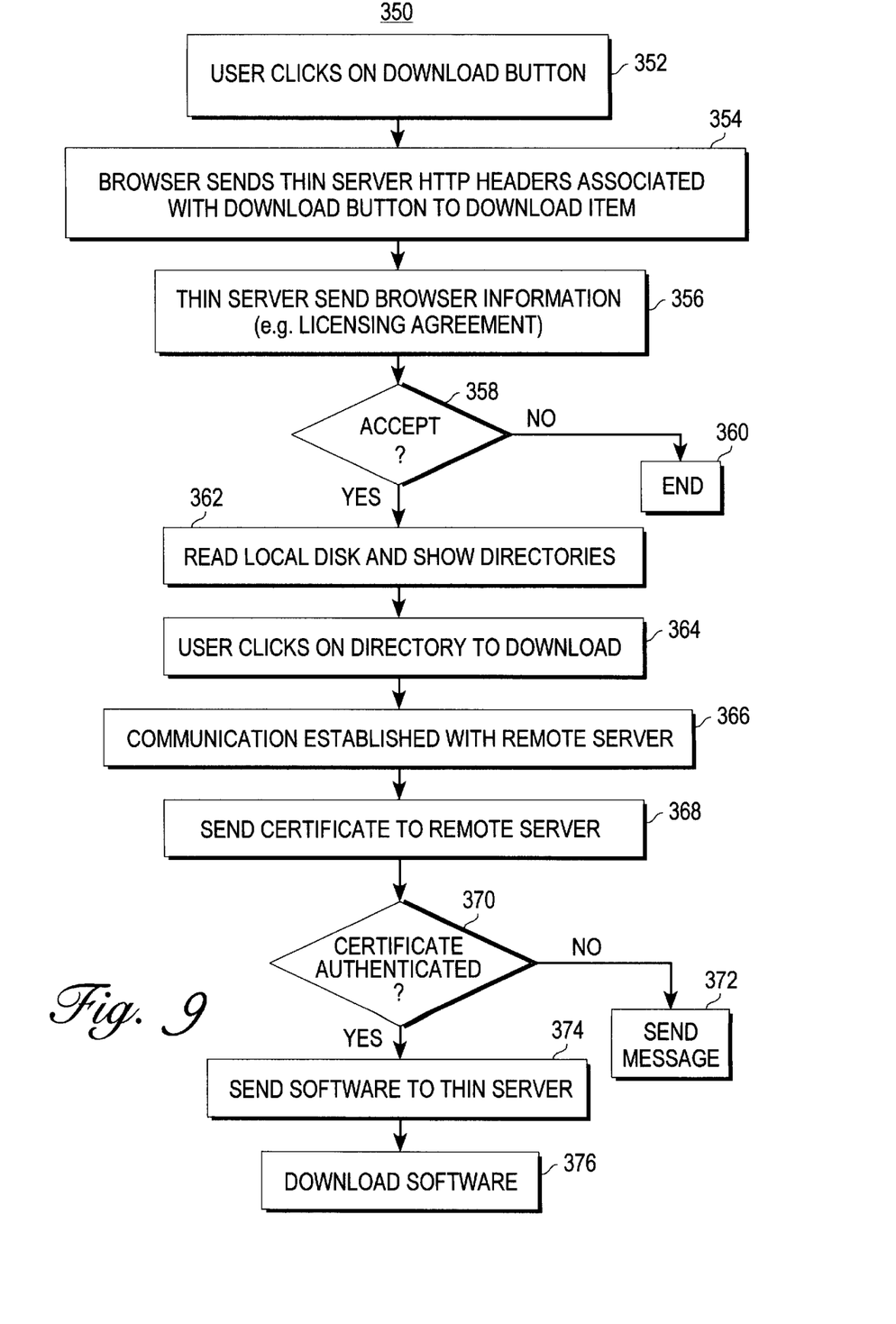
FIG. 9 is a flow chart depicting one method of validating a user's transaction in accordance with the present invention.

FIG. 9 depicts one embodiment of a method 350 for validating a user's purchase from a remote server 150. FIG. 9 begins after the thin server 120 and the local browser 110 have been executed via the method 200, and the user interface 250 displayed. The method 350 commences when the user clicks on the download button 253, via step 352. The browser 110 sends to the server 130 HTTP headers associated with the download button and indicating that the particular item is to be downloaded, via step 354. The thin server 130 may then send the browser 110 information, such as a licensing agreement, and cause the browser to display buttons allowing the user to accept or reject the agreement, via step 356. It is then determined whether the user has accepted the licensing agreement via step 358. If the user rejects the licensing agreement, then the method 350 ends via step 360.

If the user accepts the licensing agreement, then in step 362 the thin server 120 reads a local disk (not shown) which is part of the local resources 130 and displays a set of directories using the browser 110. Thus, in a preferred embodiment, the thin server 120 provides the set of directories to the browser 110 in HTML. The user then clicks on the selected directory to which the software is to be downloaded via step 364. The thin server 120 establishes communication with the appropriate remote server 150 via step 266. The thin server 120 sends the appropriate certificate 122, 124, or 126 to the remote server 150 via step 368. The remote server 150 then determines whether the certificate 122, 124, or 126 is valid via step 370. If the certificate 122, 124, or 126 is not valid, then a message indicating that the use cannot make the purchase may be sent via step 372. If the certificate is valid, then in step 374 the remote server 150 sends the thin server 120 the appropriate software. The thin server 120 then uses the local resources 130 to download the software to the selected directory via step 376.

Although described in the context of software purchases, nothing prevents the method 350 from use with another transaction or having other steps tailored to that transaction. Because the certificate 122, 124, or 126 is validated by the remote server 150, the user need not provide the remote server 150 with a user identification or password. Instead, the user can purchase items or engage in other transaction using the browser 110 and the thin server 120. The user merely clicks on the appropriate button, and validation of the certificate (and, therefore, the user) is performed automatically.

Through the use of a particular thin server 120, a user can perform other functions in an environment having the look and feel of an internet browser 110 without accessing the internet 115. A user may also have access to local resources 130 through the browser 110 and the thin server 120. Because the thin server 120 is substantially non-extensible, the thin server 120 also lends itself to security functions. Because access to the thin server 120 from external entities cart be controlled, the security of the local system is not compromised even when the browser 110 is given access to the local resources through the thin server. Note, however, that providing security is only one potential function of the thin server 120.

One function of one embodiment of the thin server 120, can be to allow the browser 110 to communicate with the remote server 150 through the thin server 120. In one embodiment, such a thin server 120 can translate between different forms of communication used by the browser 110 and the remote server 150. Thus, the applications 155 on the remote server 150 can use protocols different from that used by the browser 110. Using one embodiment of such a thin server 120, the security of the remote server 150 can be enhanced. For example, a user can be validated on the remote server 150 through the use of the thin server 110. An authorized user can also engage in secured transactions over the internet 115 through the use of the thin server 120. Because the thin server 120 can provide identification of the user, passwords and other user identifications may be eliminated. Moreover, the thin server 120 is transportable, allowing an authorized user to be validated by the remote server 150 from a variety of locations.

A method and system has been disclosed for processing and displaying data through a browser. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for displaying or processing information on a computer, the system comprising:

a thin server for communicating with a local browser local to said thin server using a protocol supported by said local browser;

wherein the thin server is not substantially extensible;

wherein the thin server is configured to receive and generate information entered and viewed by a user via user interfaces generated by the local browser; and wherein the thin server is configured to generate and provide to the local browser code that describes said user interfaces and that is executed by the local browser to generate said user interfaces.

2. The system of claim 1 further comprising: at least one local resource, wherein the at least one local resource can be accessed by the local browser through communication between the local browser and the thin server and communication between the thin server and the at least one local resource.

3. The system of claim 2 wherein the thin server is configured to accept only a connection from the local browser.

4. The system of claim 2 wherein the thin server is configured to initiate a connection to at least one particular remote server.

5. The system of claim 4 wherein the local browser communicates with the remote server through communication between the local browser and the thin server and communication between the thin server and the remote server.

6. The system of claim 5 wherein the thin server further includes:
   means for validating a user to the remote server.

7. A system for displaying or processing information on a computer, the system comprising:
   a browser configured to allow a user to view and input information; and
   a thin server for communicating with the browser, for allowing the browser to display information provided from the thin server, and for allowing the browser to provide information entered by the user to the thin server, the thin server being configured to accept a connection only from browsers that are launched by said thin server.

8. The system of claim 7 further comprising:
   at least one local resource, wherein the at least one local resource can be accessed by the browser through communication between the browser and the thin server and communication between the thin server and the at least one local resource.

9. The system of claim 7 wherein the thin server is configured to initiate a connection to at least one particular remote server.

10. The system of claim 9 wherein the browser communicates with the remote server through communication between the browser and the thin server and communication between the thin server and the remote server.

11. The system of claim 10, wherein the local browser communicates with the thin server using HTTP.

12. The system of claim 10, wherein the thin server communicates with the remote server using a protocol different than HTTP.

13. A method for displaying or processing information on a computer system comprising the steps of:
   establishing a thin server as a local server, the thin server being not substantially extensible,
   establishing a connection between the thin server and a local browser using a communication protocol supported by the local browser;
   said thin server receiving and generating information entered and viewed by a user via user interfaces generated by the local browser;
   said thin server generating code that describes said user interfaces and that is executed by the local browser; and
   said thin server transmitting said code to said browser.

14. The method of claim 13 wherein the thin server is further capable of accepting a connection only from the local browser.

15. The method of claim 13 wherein the local browser is capable of communicating with a remote server.

16. The method of claim 15 further comprising the step of:
   allowing the user to access information from the remote server through the local browser;
   wherein the local browser communicates with the remote server through communication between the local browser and the thin server and communication between the thin server and the remote server.

17. The method of claim 16 wherein the thin server further includes means for validating a user to the remote server; and wherein the step of allowing a user to access information from the remote server further includes the step of:
   allowing a user to participate in a particular transaction with the remote server only if the validating means indicates that the user is authorized to participate in the particular transaction.

18. The method of claim 16, wherein the local browser and the thin server communicate using HTTP.

19. The method of claim 18, wherein the thin server communicates with the remote server using a protocol different than HTTP.

20. The method of claim 13 wherein the method further includes the step of
   allowing a user to access at least one local resource through the browser, the at least one local resource being accessed by communication between the at least one local resource and the thin server and communication between the thin server and the browser.

21. A method for displaying or processing information on a computer comprising the steps of:
   (a) establishing a thin server as a local server on a local system, the thin server only accepting a connection from browsers launched by said thin server;
   (b) said thin server launching a browser;
   (c) establishing a connection between the thin server and the browser;
   (d) allowing a user to access the functions of the thin server through the browser.

22. A system for displaying or processing information on a computer, the system comprising:
   a thin server configured for communicating with a browser using a communication protocol supported by the browser, wherein said thin server is not substantially extensible;
   said thin server configured to allow a browser to display information provided from the thin server; and
   said thin server configured to permit browser connections only from browsers that are local to said thin server.

23. The system of claim 22 further comprising at least one local resource, wherein the at least one local resource can be accessed by the browser through communication between the browser and the thin server and communication between the thin server and the at least one local resource.

24. The system of claim 22 wherein the thin server is configured to initiate a connection to at least one particular remote server.

25. The system of claim 22 wherein the browser communicates with the remote server through communication between the browser and the thin server and communication between the thin server and the remote server.

26. A system for displaying or processing information on a computer, the system comprising:
   a thin server configured for communicating with a browser;
   said thin server configured to allow the browser to display information provided from the thin server; and
   the thin server being configured to accept a connection only from browsers that are launched by said thin server.

27. The system of claim 26 further comprising at least one local resource, wherein the at least one local resource can be accessed by the browser through communication between the browser and the thin server and communication between the thin server and the at least one local resource.

28. The system of claim 26 wherein the thin server is configured to initiate a connection to at least one particular remote server.

29. The system of claim 26 wherein the browser communicates with the remote server through communication between the browser and the thin server and communication between the thin server and the remote server.

30. A computer-readable medium carrying one or more sequences of one or more instructions for displaying or processing information on a computer system, wherein the execution of the one or more sequences of the one or more instructions causes the one or more processors to perform the steps of:

establishing a thin server as a local server, the thin server being not substantially extensible;

establishing a connection between the thin server and a local browser using a communication protocol supported by the local browser;

said thin server receiving and generating information entered and viewed by a user via user interfaces generated by the local browser;

said thin server generating code that describes said user interfaces and that is executed by the local browser; and said thin server transmitting said code to said browser.

31. The computer-readable media of claim 30 wherein the thin server is further capable of accepting a connection only from the local browser.

32. The computer-readable media of claim 30 wherein the local browser is capable of communicating with a remote server.

33. The computer-readable media of claim 32 further comprising sequences of instructions for performing the step of:

allowing the user to access information from the remote server through the local browser;

wherein the local browser communicates with the remote server through communication between the local browser and the thin server and communication between the thin server and the remote server.

34. The computer-readable media of claim 33 wherein the thin server further includes means for validating a user to the remote server; and wherein the step of allowing a user to access information from the remote server further includes the step of:

allowing a user to participate in a particular transaction with the remote server only if the validating means indicates that the user is authorized to participate in the particular transaction.

35. The computer-readable media of claim 33, wherein the local browser and the thin server communicate using HTTP.

36. The computer-readable media of claim 35, wherein the thin server communicates with the remote server using a protocol different than HTTP.

37. The computer-readable media of claim 30 wherein the computer-readable media further includes one or more instructions for performing the step of allowing a user to access at least one local resource through the browser, the at least one local resource being accessed by communication between the at least one local resource and the thin server and communication between the thin server and the browser.

38. A computer-readable medium carrying one or more sequences of one or more instructions for displaying or processing information on a computer, wherein the execution of the one or more sequences of the one or more instructions causes the one or more processors to perform the steps of:

establishing a thin server as a local server on a local system, the thin server only accepting a connection from browsers launched by said thin server;

said thin server launching a browser;

establishing a connection between the thin server and the browser; and allowing a user to access the functions of the thin server through the browser.

39. The computer-readable medium of claim 38 wherein the thin server is further capable of accepting a connection only from the browser.

40. The computer-readable medium of claim 38 wherein the browser is capable of communicating with a remote server.

41. The computer-readable medium of claim 40 further comprising one or more sequences of instructions for performing the step of:

allowing the user to access information from the remote server through the browser; and wherein the browser communicates with the remote server through communication between the browser and the thin server and communication between the thin server and the remote server.

42. The computer-readable media of claim 41 wherein the thin server further includes means for validating a user to the remote server; and wherein the step of allowing a user to access information from the remote server further includes the step of:

allowing a user to participate in a particular transaction with the remote server only if the validating means indicate that the user is authorized to participate in the particular transaction.

43. The computer-readable media of claim 34, wherein the browser and the thin server communicate using HTTP.

44. The computer-readable media of claim 36, wherein the thin server communicates with the remote server using a protocol different than HTTP.

45. The computer-readable media of claim 38 wherein the step of allowing a user to access further includes the step of allowing a user to access at least one local resource through the browser, the at least one local resource being accessed by communication between the at least one local resource and the thin server and communication between the thin server and the browser.

* * * * *